United States Patent
Houde-Walter

[11] Patent Number: 6,025,908
[45] Date of Patent: Feb. 15, 2000

[54] ALIGNMENT OF OPTICAL ELEMENTS IN TELESCOPES USING A LASER BEAM WITH A HOLOGRAPHIC PROJECTION RETICLE

[76] Inventor: William R. Houde-Walter, 6902 E. River Rd., Rush, N.Y. 14543

[21] Appl. No.: 09/080,500

[22] Filed: May 18, 1998

[51] Int. Cl.[7] .................................................. G01B 11/26
[52] U.S. Cl. ........................................................... 356/153
[58] Field of Search .................................. 356/153, 172, 356/354, 5, 399–401; 359/827, 15, 432, 565, 503, 419, 435

[56] References Cited

U.S. PATENT DOCUMENTS

| | | | |
|---|---|---|---|
| 8,911 | 4/1852 | Murrow . | |
| 2,784,641 | 3/1957 | Keuffel et al. | 88/32 |
| 3,554,630 | 1/1971 | Rogers | 356/172 |
| 4,415,225 | 11/1983 | Benton et al. | 350/3.84 |
| 4,448,500 | 5/1984 | Marling et al. | 350/574 |
| 4,756,733 | 7/1988 | Houde-Walter et al. | 65/30.13 |
| 4,930,883 | 6/1990 | Salzman | 350/574 |
| 4,934,086 | 6/1990 | Houde-Walter | 42/103 |
| 4,950,063 | 8/1990 | Pohle et al. | 350/571 |
| 5,009,502 | 4/1991 | Shih et al. | 356/152 |
| 5,121,220 | 6/1992 | Nakamoto | 359/419 |
| 5,329,347 | 7/1994 | Wallace et al. | 356/5 |
| 5,371,570 | 12/1994 | Morris et al. | 359/565 |
| 5,386,257 | 1/1995 | Swartwood | 352/198 |
| 5,433,446 | 7/1995 | Lindstedt, Jr. | 273/187.4 |
| 5,444,569 | 8/1995 | Broome | 359/435 |
| 5,500,524 | 3/1996 | Rando | 250/216 |
| 5,506,702 | 4/1996 | Simpson | 359/15 |
| 5,508,844 | 4/1996 | Blake, Sr. | 359/503 |
| 5,509,226 | 4/1996 | Houde-Walter | 42/103 |
| 5,530,547 | 6/1996 | Arnold | 356/354 |
| 5,543,916 | 8/1996 | Kachanov | 356/354 |
| 5,543,963 | 8/1996 | Freedenberg et al. | 359/432 |
| 5,617,444 | 4/1997 | Houde-Walter | 372/77 |
| 5,687,034 | 11/1997 | Palmer | 359/827 |
| 5,718,496 | 2/1998 | Feldman et al. | 353/42 |

OTHER PUBLICATIONS

Laser Focus World, Lasermax, Dec. 15, 1996, Rochester, New York.
Astronomy, Marketplace, Jul. 17, 1997, p. 94, Johnstown, Colorado.
Bouchra Lahnin, Oct. 2, 1997 10:34 PM,US and EP Search Results 01/17.
Bouchra Lahnin, Oct. 2, 1997 10:34 PM,US and EP Search Results 02/17.
Bouchra Lahnin, Oct. 2, 1997 10:34 PM,US and EP Search Results 03/17.
Bouchra Lahnin, Oct. 2, 1997 10:34 PM,US and EP Search Results 04/17.
Bouchra Lahnin, Oct. 2, 1997 10:34 PM,US and EP Search Results 05/17.
Bouchra Lahnin, Oct. 2, 1997 10:34 PM,US and EP Search Results 06/17.
Bouchra Lahnin, Oct. 2, 1997 10:34 PM,US and EP Search Results 07/17.
Bouchra Lahnin, Oct. 2, 1977 10:34 PM,US and EP Search Results 08/17.
Bouchra Lahnin, Oct. 2, 1997 10:34 PM,US and EP Search Results 09/17.
Bouchra Lahnin, Oct. 2, 1997 10:34 PM,US and EP Search Results 10/17.
Bouchra Lahnin, Oct. 2, 1997 10:34 PM,US and EP Search Results 11/17.

(List continued on next page.)

*Primary Examiner*—Frank G. Font
*Assistant Examiner*—Michael P. Stafira
*Attorney, Agent, or Firm*—Harter, Secrest & Emery LLP; Brian B. Shaw

[57] ABSTRACT

The present invention includes a diffractive optic and an illuminator for illuminating the diffractive optic. The illuminated diffractive optic forms a reticle image which is projected onto the optical elements to be aligned.

22 Claims, 7 Drawing Sheets

OTHER PUBLICATIONS

Bouchra Lahnin, Oct. 2, 1997 10:34 PM,US and EP Search Results 12/17.
Bouchra Lahnin, Oct. 2, 1997 10:34 PM,US and EP Search Results 13/17.
Bouchra Lahnin, Oct. 2, 1997 10:34 PM,US and EP Search Results 14/17.
Bouchra Lahnin, Oct. 2, 1997 10:34 PM,US and EP Search Results 15/17.
Bouchra Lahnin, Oct. 2, 1997 10:34 PM,US and EP Search Results 16/17.
Bouchra Lahnin, Oct. 2, 1997 10:34 PM,US and EP Search Results 17/17.

Nanotrack, at least as early as Jun. 1, 1998, Rochester, New York.

Diode Lasers, at least as early as Jun. 1, 1998, Rochester, New York.

Totally Internal. Nothing External, at least as early as Jun. 1, 1998, Rochester, New York.

Ready When You Are, at least as early as Jun. 1, 1998, Rochester, New York.

Nato Approved and Sight Unseen, at least as early as Jun. 1, 1998, Rochester, New York.

ALIGNMENT OF OPTICAL ELEMENTS IN TELESCOPES USING A LASER BEAM WITH A HOLOGRAPHIC PROJECTION RETICLE

FIELD OF INVENTION

The present invention generally relates to the alignment of optical elements, and more specifically to the alignment of the mirrors in a telescope using a laser beam and a diffractive optic to form a projected image, wherein the optical element is aligned in response to the projected image.

BACKGROUND OF THE INVENTION

Many telescopes rely upon a mirror or a mirror system to capture and reflect a desired image. However, for telescopes to operate properly, the mirrors must be properly aligned. The alignment of the mirrors in a telescope can be very cumbersome and time consuming. Many different methods have been utilized to align the mirrors so that a primary mirror would be aligned with a secondary mirror. For example, a prior method requires use of a specialized eye piece with crosshairs and apertures to align the telescope. In order to use these optical alignment devices, the large primary mirror must be removed. The center of the primary mirror is then located and a black dot is placed in the center of the mirror. Such removal of the mirror subjects the primary mirror to potential damage, such as scratching or breakage.

An alternative method of aligning the optical elements in a telescope is to use a known star and align the telescope in total darkness. However, this method wastes valuable observation time. Further, the accuracy of the alignment is limited to the image of the star, and the image of the star is substantially degraded by passage of the light through the atmosphere.

Newtonian type telescopes are subject to misalignment of the optical elements by shifting due to repositioning of the telescope or by transporting the telescope. A misaligned Newtonian telescope will exhibit an image of a star that looks like a comet with a tail. The misaligned telescope is not efficient in the collection of light as a light bundle is not centered on the mirror.

Lasers have been used for several years for aligning the mirrors in a telescope. In a properly aligned or collimated telescope, a laser beam is projected through an emission aperture to reflect off the secondary mirror which directs it to the center of the primary mirror. The primary mirror reflects the beam back to the secondary mirror which then reflects it back to the emission aperture of the laser. The complete return of the laser through the emission aperture assures that the telescope is correctly aligned. However, in order to accurately use a laser in aligning a telescope, the telescope must be modified for the use of a laser. The primary mirror is removed and marked with a small white circle circumscribing the center of the mirror. The white circle provides a sighting target in the alignment process to confirm that the laser beam is placed in the center of the mirror. The laser is then aligned with the white circle. Once again, the disruption of the telescope is required and subjects the mirror to possible harm.

Some telescope designs employ a cored primary mirror. A cored primary mirror includes a hole in the center of the mirror. This hole precludes any of the previous alignment methods that rely upon dots, circles or markings at the center of the primary mirror. A telescope having a cored primary mirror must be aligned by the stars, and thus suffers from the accompanying problems.

Therefore, a need exists for aligning the optical elements of a telescope without requiring extensive downtime of the telescope. A further need exists for the alignment of the optical elements in a telescope without exposing the optical elements to potential damage, such as scratches or breakage. A still further need exists for aligning the optical elements in a telescope in a simple, inexpensive manner in which most people can perform in a relatively short period of time.

SUMMARY OF THE INVENTION

The present invention provides for the ready, reproducible and accurate alignment of the optical elements in a telescope. The present invention includes an apparatus for aligning the optical elements in a telescope, and particularly a laser generator for generating a laser beam along an optical path and diffractive optic disposed in the optical path. The diffractive optic may include a holographic plate having a reticle image reconstructable by the laser beam; wherein the holographic plate is located to dispose the reconstructed reticle image upon an optical element.

In a preferred configuration, the reticle image combines several images including a crosshair with gradations, a ring for centering the image, and a bright central spot. In a further construction, the reticle image includes an outer ring circumscribing the inner ring. Further, the gradations may be of a repeat to provide ready recognition of a series or groups of the gradations.

The present invention includes a method for aligning the optical elements in a telescope including projecting a reticle image on a secondary mirror; reflecting the reticle image from the secondary mirror to intersect at least a portion of the primary mirror; and aligning at least one of the primary mirror and the secondary mirror with the reflected image of the reticle. In a further method the primary mirror is adjusted to reflect the reticle image to a predetermined location.

DETAILED DESCRIPTION OF THE PREFERRED EMBODIMENT

Figure 1:
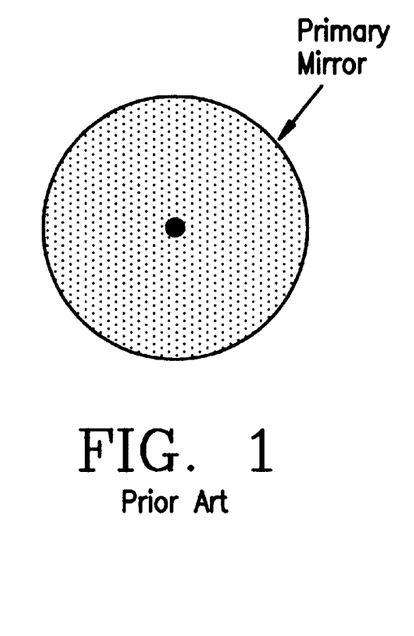
FIG. 1 is a top plan view of a primary mirror having the optical center marked with a black dot as employed in the prior art.
Figure 2:
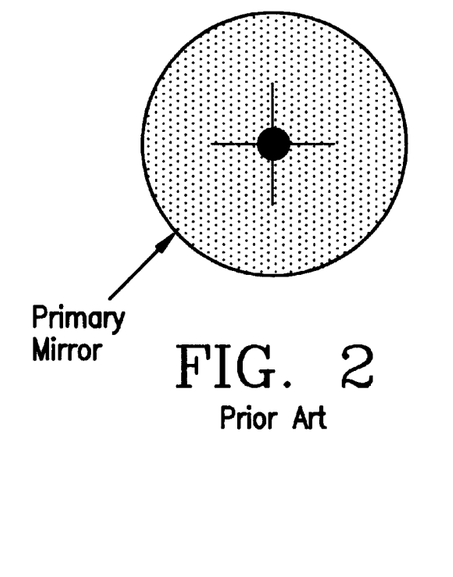
FIG. 2 is a view through the eyepiece in a first prior art method of aligning the optical elements in a telescope.

Referring to FIG. 1, a standard marking element in a prior method for aligning the optical elements is shown. In this prior method, the primary mirror is removed, the center of the primary mirror is located and a black dot is placed in the center of the mirror. Referring to FIG. 2, after the marked primary mirror is reinstalled with the marked black dot, the eyepiece is used to align with the black dot.

Figure 3:
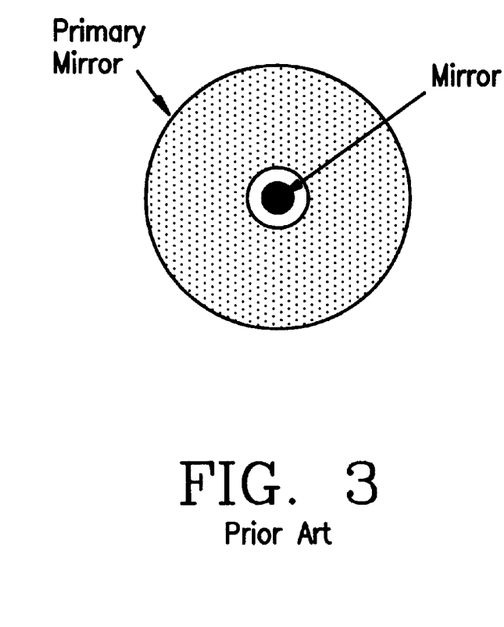
FIG. 3 is a top plan view of a primary mirror having the optical center marked with a white circle as employed in the prior art.
Figure 4:
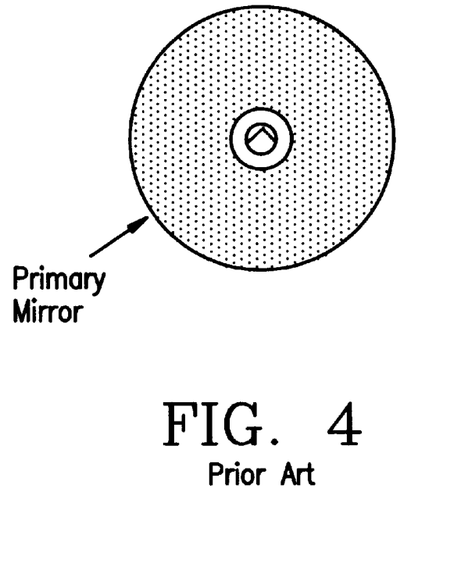
FIG. 4 is a top plan view of the primary mirror of FIG. 3 with a projected laser beam aligned with the applied white circle.

As shown in FIG. 3, in an alternative prior method, the primary mirror is removed, the center of the mirror is located and marked with a small white circle to locate the center of the mirror. Referring to FIG. 4, a projected laser spot is in the middle of the white circle, thereby providing a sighting target in the alignment process.

Figure 5:
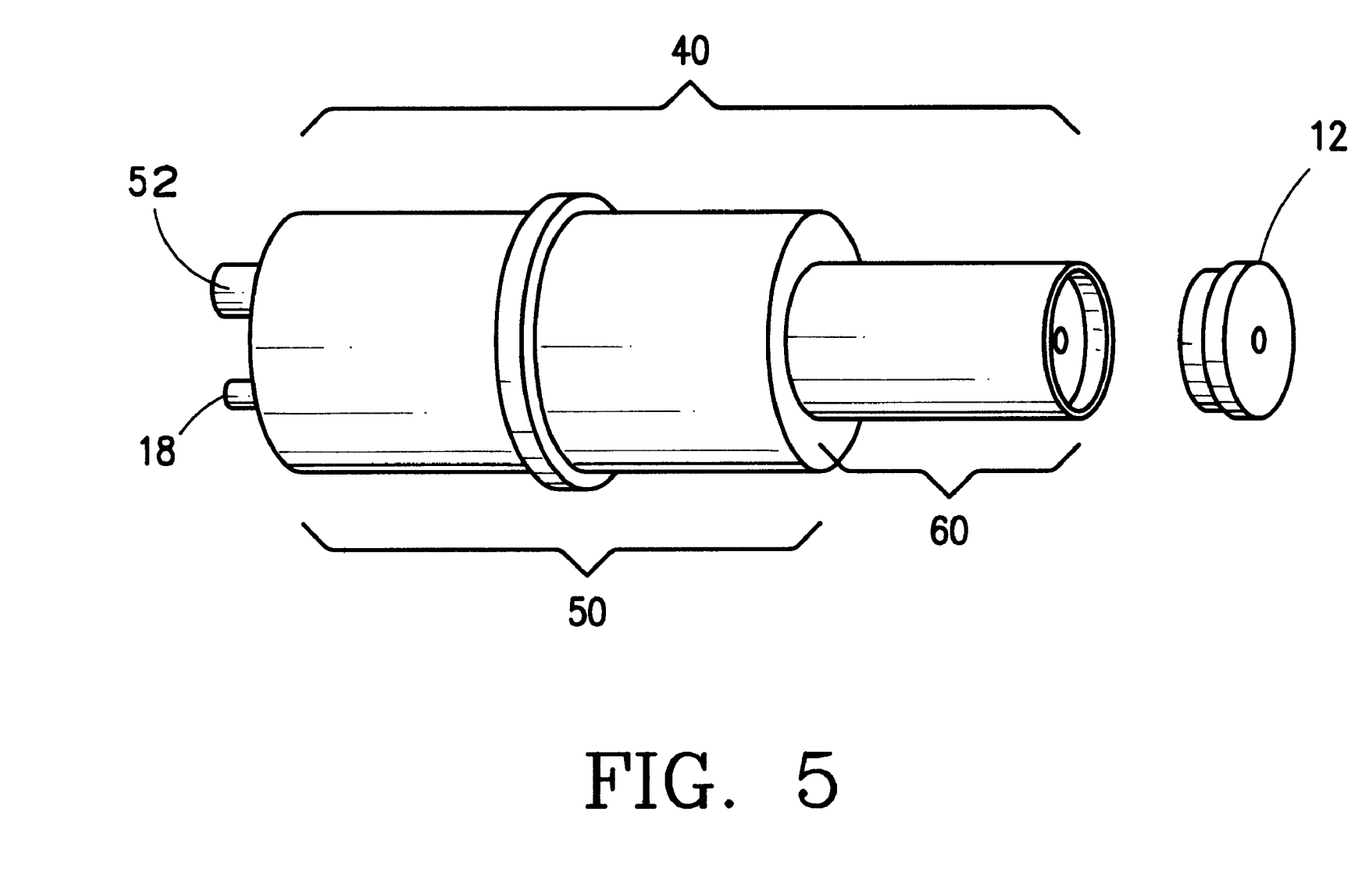
FIG. 5 is a perspective view of the laser collimator showing a hologram plate spaced from operable engagement with a housing.

Referring to FIG. 5, the present invention includes a laser collimator 10. The laser collimator 10 includes a housing 40 and a diffractive optic such as a hologram plate 12.

The housing 40 includes a primary barrel 50 and a secondary barrel 60, wherein the primary barrel has a first diameter and the secondary barrel has a second smaller diameter. The housing 40 is preferably comprised of aircraft grade aluminum; however, other suitable materials such as stainless steel or plastic may be used. In the construction of the housing with aircraft grade aluminum, the laser collimator 10 and its optics and alignment can withstand an impact of 2000 G.

The primary barrel 50 is sized to accommodate a laser generator 52 and control components. The laser generator 52 may be any of a variety of lasers generators including a battery powered diode laser, such as a 5 mW 635 nm laser. The brightest laser available in its FDA regulated safety class is preferably employed. Thus, the laser generator 52 provides a low level of diffuse red laser illumination for inspection of the optical path in daylight or total darkness of the telescope. Alternatively, a high brightness green laser may be employed. For example, a commercially available high brightness green laser system, is the TLC™-203N, available from LaserMax, and may be employed in the alignment of very large and multiple mirror telescopes. Further, the laser beam may have an elliptic cross section perpendicular to the optical path of the beam. In addition, the laser generator 52 is a non scanning laser, and thereby reduces the cost of the apparatus. Further, although coherent light is preferred, it is understood that incoherent light may be employed.

The control components include a power or on/off switch 20. An emission indicator 18 may also be employed to indicate functioning of the device.

The secondary barrel 60 is sized to fit within most common telescope eyepiece openings and, preferably a Newtonian telescope. In a preferred configuration, the primary barrel 50 has an approximate 2 inch diameter and a length of at least 0.5 inches. The secondary barrel 60 has a diameter of approximately 1.25 inches and an approximate length of 0.5 inches. Thus, the laser collimator 10 fits standard 1.25 inch and 2 inch focus mechanisms. However, the housing 40 or the secondary barrel 60 may be sized to a 0.925 inch outer diameter to accommodate another common telescope eyepiece holder size.

The secondary barrel 60 is constructed to retain the diffractive optic such as a hologram plate 12. Preferably, the hologram plate 12 is retained in the secondary barrel 60 by a threaded connection. The secondary barrel 60 preferably has standard 1.25×32 inside threads. The hologram plate include compatible threads. Thus, the outer surface of the secondary barrel 60 is free of projections which could interfere with the corresponding eyepiece structure of the telescope.

The hologram plate 12 includes a holographic diffractive reticle image 30. The reticle image 30 may be formed on the plate by a variety of methods. The reticle may be imprinted on the lens, positioned between two layers of the lens, or attached to the lens of the laser collimator 10 by any standard technique or process.

Preferably, the housing 40 and hologram plate 12 are configured to pass the diffractive image through a predetermined aperture. This aperture is identified as a laser aperture. The reticle image 30 thus passes from the hologram plate 12 via a laser aperture. Preferably, the hologram plate 12 and laser aperture are selected to be centered with respect to the secondary barrel 60 and hence the eyepiece of the telescope.

Figure 6:
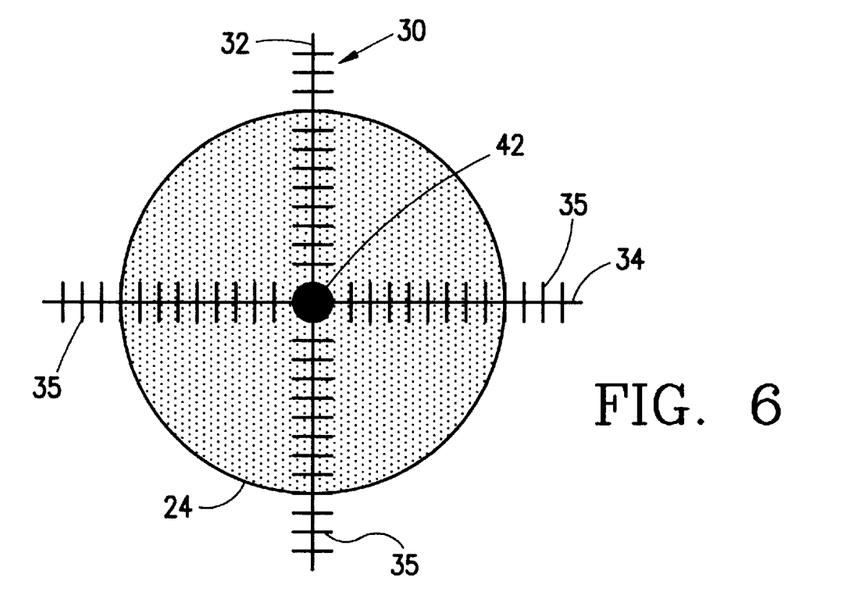
FIG. 6 is first configuration of the reconstructed reticle image projected on a primary mirror.
Figure 7:
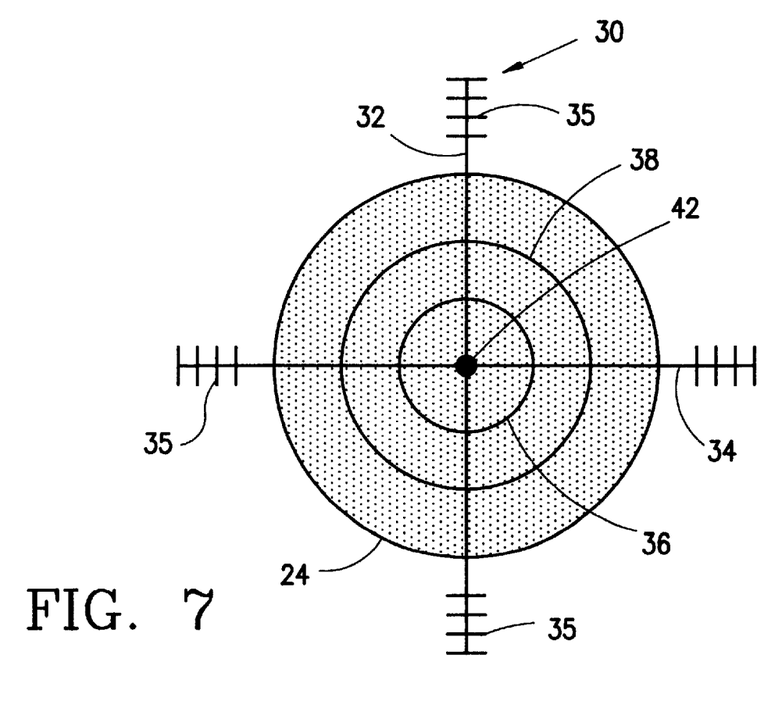
FIG. 7 is second configuration of the reconstructed reticle projected on a primary mirror.
Figure 8:
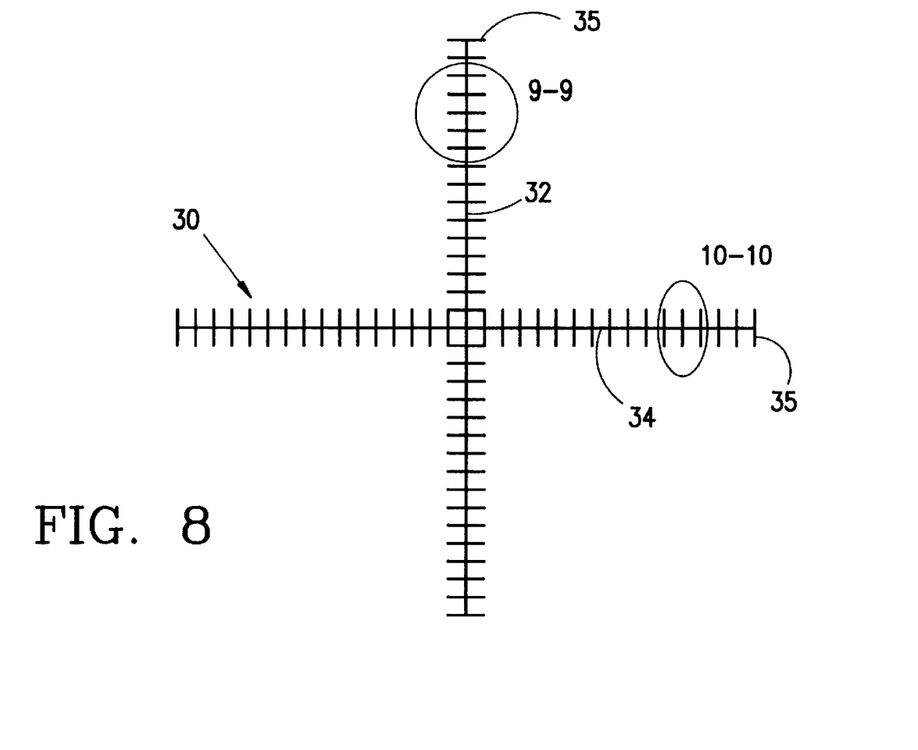
FIG. 8 is a projected reticle image.
Figure 9:
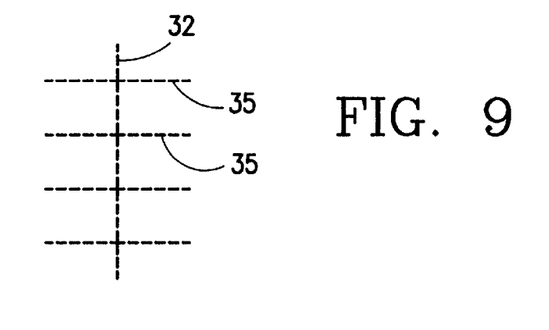
FIG. 9 is an enlarged view of a gradation portion of the reticle image of FIG. 8, as encompassed by line 9—9 in FIG. 8.

The reticle image 30 as shown in FIGS. 6 and 7, combines several images including a crosshair formed of linear segments 32, 34 with gradations 35, an inner ring 36 for centering the image, and a bright central spot 42. Preferably, the linear segments 32, 34 are perpendicular to each other and the gradations 35 intersect a given linear segment 32, 34 and are perpendicular to the respective linear segment. The linear segments are pixelated along the length of the linear segment. Thus, the resolution is provided by the linear segments rather than the gradations 35. The gradations 35 are used to identify a particular number or occurrence of pixelations along the linear segment 32, 34. In a preferred embodiment, the linear segments 32, 34 include a base ten pixelation along the length of the respective segment. The bright central spot 42 is formed at the intersection of the linear segments 32, 34. The inner ring 36 is preferably concentric with the intersection of the linear segments 32, 34, and is further centered with respect to the gradations 35. An outer ring 38 may be employed in the reticle image 30. Preferably, the outer circle 38 is concentric with the inner circle and lines within a radius defined by the gradations 35. Further, the gradations 35 may be of a repeat to provide ready recognition of a series or groups of gradations. For example every other, every third or every fourth or more gradation may be a different size than an adjacent gradation. In addition, the gradations may be of varied spacing and need not be precisely spaced apart. The important aspect is the gradations are equal about opposite sides of the intersection of the linear segments 32, 34. Further, as shown in FIG. 9, the gradations 35 may be formed of a multitude of smaller line segments.

Although a hologram has been described in detail, it is possible to form the reticle by a photographic plate or layer. The photographic layer has the reticle pattern formed therein and upon passage of a light through the photographic plate, the reticle image 30 is formed and projected along the optical path. Thus, the diffractive optic is disposed in the optical path of the laser collimator 10 to form the reticle image 30.

Preferably, the reticle image 30 is sized to dispose at least a portion of the reticle image 30 beyond the periphery of the optical element to be aligned. The size of the reticle image 30 is determined in part by the size of the telescope barrel as well as the optical elements to be aligned.

Figure 10:
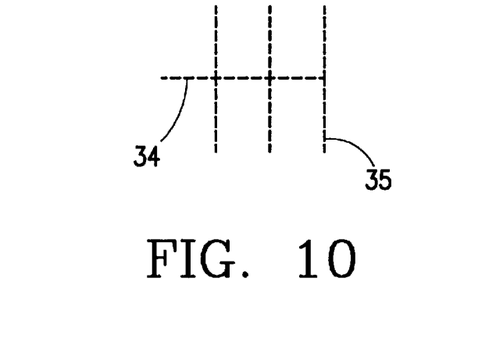
FIG. 10 is a enlarged view of a gradation portion of the reticle image of FIG. 8, as encompassed by line 10—10 in FIG. 8.
Figure 11:
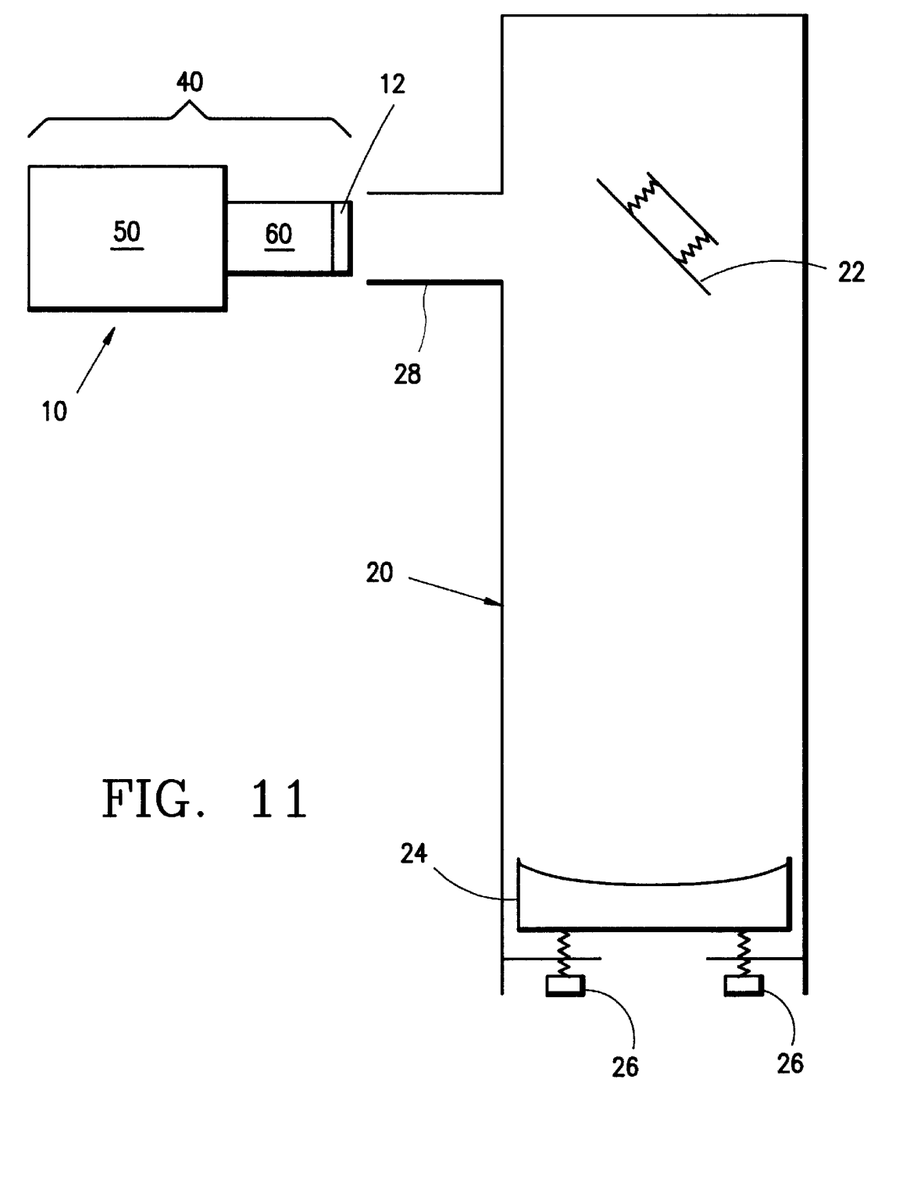
FIG. 11 is a side elevational view of the laser collimator operably disposed in a telescope to align the optical elements.

Referring to FIG. 11, the laser collimator 10 is located in an operative environment. The telescope includes a optical cylinder having a primary mirror 24, a secondary mirror 22 and an eyepiece holder 28. The eye piece holders are preferably 0.965 inches, 1.25 inches or 2 inches in diameter. For purposes of clarity, the eyepiece of the telescope is omitted from FIG. 10. The secondary mirror 22 and the primary mirror 24 may be adjusted by one or more adjusters 26. It is understood the configuration of the telescope is illustrative and the present invention may be practiced with any of a variety of optical elements.

METHOD OF OPERATION

To employ the laser collimator 10, the telescope eyepiece is removed from the eye piece holder 28. The laser collimator 10 is mounted in the eye piece holder 28 instead of the eye piece so as to locate the secondary barrel 60 within the eye piece holder.

In the alignment of the primary mirror and the secondary mirror in a Newtonian telescope, the laser collimator 10 is then turned on. The laser passes through the hologram plate 12 and recreates the reticle image 30. Generally, the reticle image 30 is projected onto the secondary mirror 22. The reticle image reflects from the secondary mirror 22 and intersects the primary mirror 24.

Using the projected and reflected reticle image 30, the secondary mirror 22 is adjusted until the reticle pattern image 30 is centered exactly on the primary mirror 24. The mount(s) connected to the secondary mirror 22 are used to dispose an equal number of projected indicia on opposing sides of the center of the crosshairs as it is imaged on the primary mirror 24. The centered status of the reticle image 30 is determined by aligning the gradations 35 with the periphery of the primary mirror 24. The inner circle 36 and outer circle 38 (if employed) may be used to assist centering the reticle image upon the primary mirror.

Figure 12:
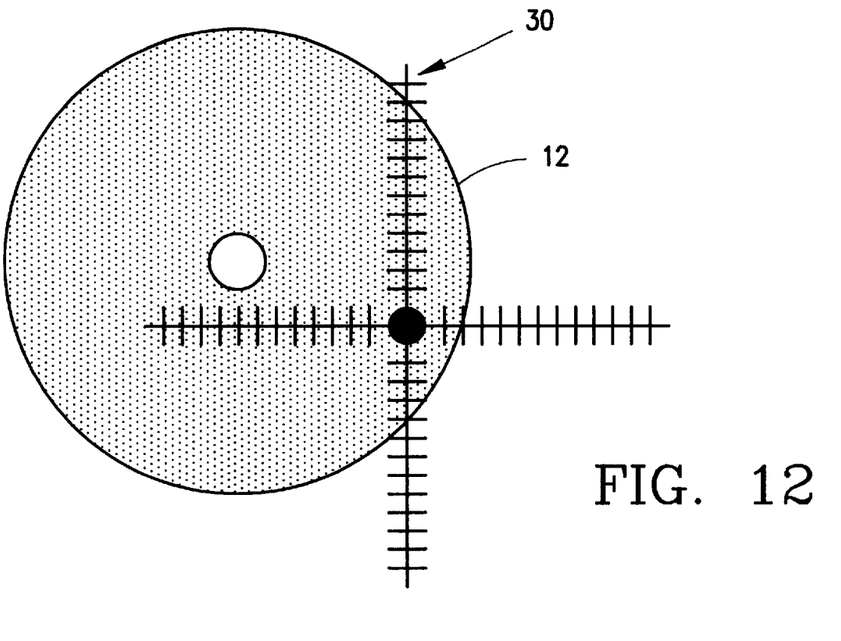
FIG. 12 is plan view of a reconstructed reticle projected on an eyepiece aperture of a hologram plate, wherein the reticle is misaligned.
Figure 13:
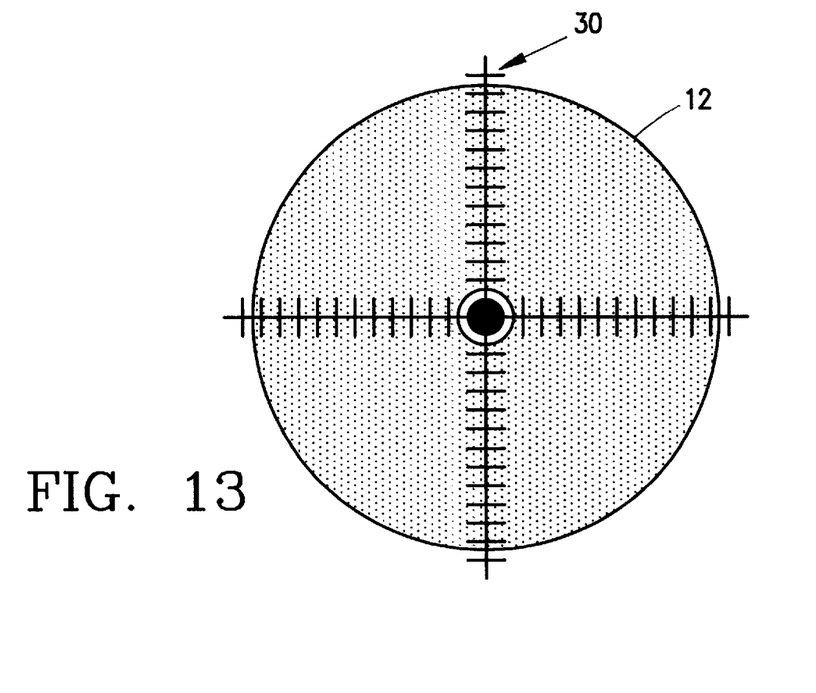
FIG. 13 is plan view of a reconstructed reticle projected on an eyepiece aperture of a hologram plate, wherein the reticle is substantially aligned.

Once centered on the primary mirror 24, the reticle image 30 is reflected back to the secondary mirror 22 and toward the laser aperture. The mount for the primary mirror 24 is then adjusted using adjusters 26 to reflect the reticle image 30 back to the laser aperture centered in the eye piece aperture of the telescope. The necessary adjustment to the primary mirror is accomplished by using its adjustment screws 26 to dispose the reticle image 30 reflected from the primary mirror 24 the secondary mirror 22 and onto the laser aperture. Referring to FIGS. 12 and 13, by returning the cross hair image to the laser aperture, the alignment is less ambiguous as the cross hair image is easily placed over the laser aperture.

Figure 14:
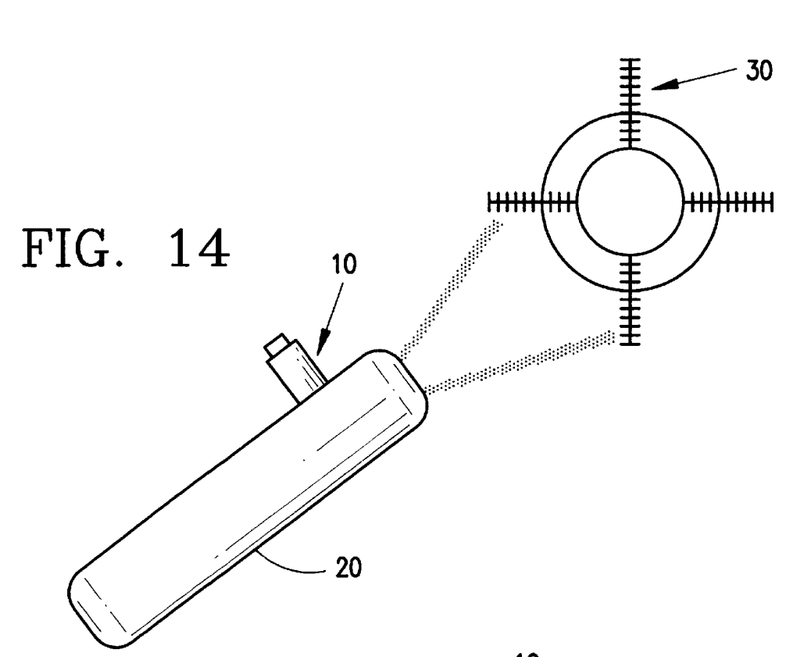
FIG. 14 is a schematic view of the projection of the reticle image to center a secondary mirror by blocking a portion of the projected image.

Further, the centration of the secondary mirror 22 in the telescope aperture may be confirmed by passing the reflected reticle image from the primary mirror out of the telescope, as shown in FIG. 14. That is, the diverging diffractive reticle image 30 is reflected back by the primary mirror 24 and is used to confirm centration of the secondary mirror in the telescope aperture. The secondary mirror blocks a corresponding portion of the image reflected from the primary mirror as the image passes from the telescope. By properly locating the portion of the reticle that passes the secondary mirror with respect to the portion of the reticle that is blocked by the secondary mirror, the centration of the secondary mirror is confirmed.

While prior techniques may align the primary mirror, the secondary mirror may still not be centered on the optical path. A non centered secondary mirror causes asymmetrical diffraction patterns and an increase in off axis aberrations. In the present invention, the reflection of the diverging diffractive reticle image 30 out of the telescope 20 from the primary mirror 24 is used to confirm centration of the secondary mirror 22 in the telescope aperture.

The reticle image 30 also allows inspection of the mirror coatings for defects as well as illumination of any obstructions in the optical path. That is, the gradations and inner circle may be used to identify variations in mirror coatings.

Figure 15:
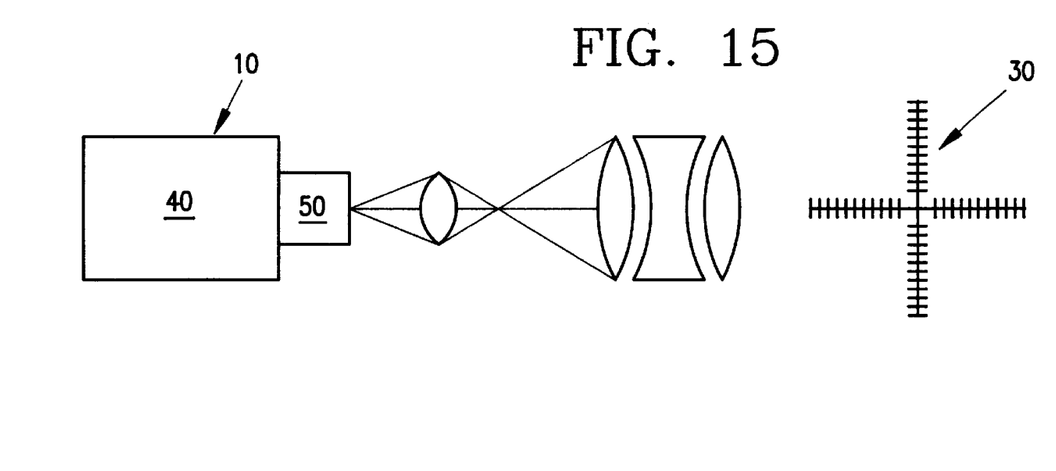
FIG. 15 is a side elevational view of the projected reticle image in aligning a refracting type telescope.

The laser projected reticule 30 will align all Newtonian telescopes as fast as f/35 and even those incapable of alignment with old style laser based collimators, such as Cassegrain-Newtonian telescopes with cored primaries or Newtonians with primary mirrors that have been marked with black spots in their center for Cheshire collimation techniques. Further, the present invention may be used to align refracting telescopes, whose optics are schematically shown in FIG. 15.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

I claim:

1. A method of aligning an optical element in a telescope, comprising:

(a) projecting a reticle image having one of a series of lines, dots, or crosshairs onto the optical element; and (b) aligning the optical element in response to the projected reticle image.

2. The method of claim 1, further comprising forming the reticle image to include a crosshair and at least one circle.

3. The method of claim 1, further comprising forming the reticle image to include a plurality of spaced gradations.

4. The method of claim 1, further comprising locating the optical element in a reflecting telescope.

5. The method of claim 1, further comprising locating the optical element in a Newtonian telescope.

6. The method of claim 1, further comprising forming the reticle image with a laser.

7. The method of claim 1, further comprising adjusting the optical element to reflect the image to a predetermined location.

8. The method of claim 1, further comprising forming the reticle image with a laser having an elliptic cross sectional area.

9. The method of claim 1, further comprising selecting the reticle image to dispose a portion of the projected reticle image beyond a periphery of the optical element.

10. A method of aligning an optical element in a telescope, comprising:

(a) passing a laser through a diffractive optic to form a projected reticle pattern; and (b) aligning the optical element in response to the projected pattern.

11. The method of claim 10, further comprising employing a plurality of mirrors as the optical elements.

12. The method of claim 10, further comprising employing a crosshair and at least one circle in the pattern.

13. The method of claim 10, further comprising sizing the projected pattern to extend beyond a periphery of the optical element.

14. The method of claim 10, further comprising employing a hologram as the diffractive optic.

15. A method of aligning an optical element in a telescope, comprising:
   (a) projecting a holographic image onto at least a portion of an optical element to be aligned; and
   (b) aligning the optical element in response to the projected holographic image.

16. The method of claim 15, further comprising employing a mirror as the optical element.

17. The method of claim 15, further comprising employing a reticle in the holographic image.

18. A method of aligning optical elements in a telescope, comprising:
   (a) inserting a laser collimator into an eyepiece holder in the telescope;
   (b) reconstructing a reticle image having one of a series of lines, dots, or crosshairs with the laser collimator and projecting the reconstructed reticle image onto a secondary mirror; and
   (c) adjusting the secondary mirror in response to the reflected reticle image intersecting a portion of the primary mirror.

19. The method of claim 18, further comprising adjusting the primary mirror to reflect the reticle image to a predetermined location.

20. An apparatus of aligning an optical element in a telescope, comprising:
   (a) a housing sized to be releasably received within an eyepiece holder in the telescope;
   (b) a laser generator located in the housing for generating a laser beam along an optical path; and
   (c) a diffractive optic connected to the housing and disposed in the optical path to form an image reconstructable by the laser beam;
   the diffractive optic located to dispose a portion of the reconstructed image beyond a periphery of an optical element to be aligned.

21. The apparatus of claim 20, wherein the diffractive optic is a hologram.

22. The apparatus of claim 20, wherein the reconstructed image is a reticle image.

* * * * *